UNITED STATES PATENT OFFICE.

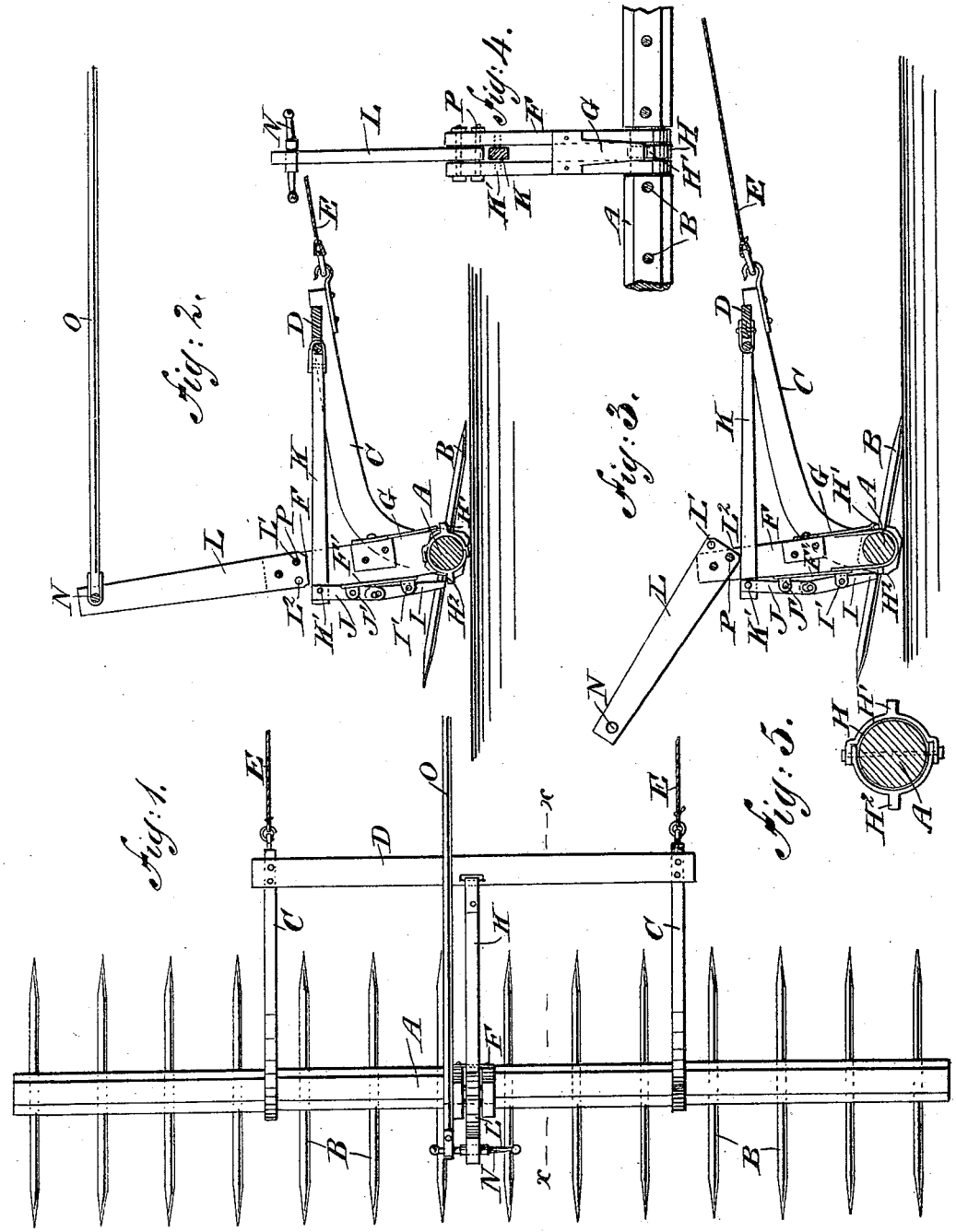

NATHAN H. MILLER, OF RUSHVILLE, OHIO.

HAY-RAKE.

SPECIFICATION forming part of Letters Patent No. 461,765, dated October 20, 1891.

Application filed April 25, 1891. Serial No. 390,425. (No model.)

*To all whom it may concern:*

Be it known that I, NATHAN H. MILLER, of Rushville, in the county of Fairfield and State of Ohio, have invented a new and Improved Hay-Rake, of which the following is a full, clear, and exact description.

My invention is an improvement in that class of rakes whose toothed heads revolve in forwardly-extended arms to which the draft-animal is attached.

The improvement relates to the means for rotating the toothed head or rake-shaft, as hereinafter described.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line $x\,x$ of Fig. 1. Fig. 3 is a like view of the same in a different position. Fig. 4 is a front view of part of the improvement, and Fig. 5 is an enlarged transverse section of the rake-shaft.

The revolving hay-rake is provided with a shaft A, carrying the diametrically-extending rake-fingers B, as is plainly illustrated in the drawings. The shaft A is mounted to turn in suitable bearings formed in the side arms C of the draft-frame, the said side arms being preferably L-shaped and connected at their free ends by a cross-bar D. The draft-frame is adapted to be connected in the usual manner with the traces E, carried by the animal for pulling the rake over the field.

In the middle of the shaft A is pivoted an upwardly-extending arm F, preferably forked, as illustrated in the drawings, and carrying at its front a spring G, adapted to abut at its free end against a projection or lug $H'$, formed on a ring H, secured to the shaft A. On the ring H is arranged a second lug or projection $H^2$, located diametrically opposite the lug $H'$, as is plainly shown in Figs. 2, 3, and 5, the said second lug $H^2$ being adapted to be engaged by the free end of a lever I, fulcrumed at $I'$ to a plate $F'$, secured to the rear of the arm F. The lever I extends upward and is pivotally connected with a second lever J, fulcrumed at $J'$ to the above-mentioned plate $F'$. The upper end of the lever J is hung on a pivot $K'$, held on the rear end of an arm K, extending through the forked arm F to connect pivotally with the cross-bar D of the draft-frame. The pivot-pin $K'$ extends sufficiently on each side of the arm F to engage the rear end of the latter to prevent or limit the inward swinging motion of the upper end of the lever J.

In the upper end of the arm F is pivoted a lever L, carrying at its extreme upper end a handle N, adapted to be taken hold of by the operator or pivotally connected with a rod O, extending forward to the operator when seated on the animal harnessed to the traces E. In the lower end of the lever L are arranged two transverse apertures $L'$ and $L^2$, adapted to be engaged by a bolt P, held in the upper end of the arm F. The aperture $L'$ is engaged by the bolt P, as shown in Fig. 2, when the rod O is used; but when it is desired to operate the rake from the rear by the operator walking on the ground then the bolt P engages the opening $L^2$, as illustrated in Fig. 3. The lever L then extends in an inclined position and rearward to permit the operator to conveniently take hold of the handles N.

The operation is as follows: When the rake is to be actuated by the driver seated on the animal pulling the rake over the field, then the several parts are in the position illustrated in Figs. 1 and 2. When a sufficient quantity of hay has accumulated on the rake-fingers B, projecting in front of the shaft A, the operator pulls on the rod O, so that the lever L, on account of being rigidly connected with the arm F, imparts a forward swinging motion to the latter, whereby the free end of the spring G abuts against the projection $H'$, and the rod K by pressing on the lever J causes a swinging of the lever I, so that the lower end of the latter is thrown out of the path of the projection $H^2$. When the spring G presses on the lug $H'$, the forwardly-projecting pointed ends of the raking-fingers B engage the ground, so that the rake is revolved, the shaft A turning in the bearings in the draft-frames C. Thus a windrow is formed. After the operator has pulled on the rod O he releases the pressure, so that the arm F assumes its former position and the lever I engages the lug $H'$. When the turning of the rake has been completed, the lug $H^2$ passes under the free end of the spring G, so that the several parts are again in the position shown in Fig. 2, with the only difference that the lugs H' and H² have exchanged positions.

It is understood that the levers I and J are actuated by their connection with the rod K and the arm F, which carries the fulcrums for the said levers, so that when the arm F is swung forward the fulcrums move with the arms, and the rod K by being connected with the draft-frame causes the said levers to swing.

When it is desired to actuate the rack from the rear without the usual rod O, then the lever L is swung rearward into the position shown in Fig. 3 and locked in its position by the bolt P. The operation is the same as above described—that is, when the operator desires to turn the rack he pulls on the handles N of the lever L, so as to swing the arm F forward. The above-described operation is then repeated.

It will be seen that the rake thus constructed is very simple and durable and contains but few parts, which are not liable to get out of order and in case of injury can be readily replaced.

As illustrated in Fig. 5, the ring is preferably made in two parts, so as to be readily clipped to the shaft A.

Having thus described my invention, I claim as new and desire to secure by Letters Patent—

1. In a rake of the class described, the combination, with the rake-shaft having lugs, as specified, and the fingers and draft-frame, of an arm pivoted vertically on said shaft, a spring attached to said arm and adapted to engage one of said lugs, two levers I and J, pivoted separately but in alignment on the rear side of the said arm, a rod K, pivotally connected with the free upper end of the lever J, and means for operating the rake, as shown and described, whereby the forward movement of said arm tilts the levers I and J and thus disengages the latter from the lug on the rake-shaft.

2. In a rake of the class described, the combination, with the rake-shaft, fingers, and draft-frame, of an arm pivoted on the said rake-shaft, a lever pivoted on the said arm and adapted to engage a lug on the said rake-shaft, a second lever pivoted on the said arm and pivotally connected with the first-named lever, a rod or link pivoted on the draft-frame and connected with the said second lever, a spring held in the said arm and adapted to engage a lug on the said rake-shaft, and means for operating the said pivoted arm, substantially as shown and described.

NATHAN H. MILLER.

Witnesses:
OWEN YOST,
JOHN H. YARNELL.